US012648528B1

(12) United States Patent
Alazba et al.

(10) Patent No.: US 12,648,528 B1
(45) Date of Patent: Jun. 9, 2026

(54) AUTOMATED IRRIGATION SYSTEM FOR TREES

(71) Applicant: KING SAUD UNIVERSITY, Riyadh (SA)

(72) Inventors: Abdulrahman Ali Alazba, Riyadh (SA); Moath Abdulrahman Alathbah, Riyadh (SA); Nasser Abdullah Alradyan, Riyadh (SA); Mahmoud Saad Mosa, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/549,230

(22) Filed: Feb. 25, 2026

(51) Int. Cl.
    *A01G 25/16* (2006.01)
    *G01N 27/22* (2006.01)
(52) U.S. Cl.
    CPC ......... *A01G 25/162* (2013.01); *G01N 27/221* (2013.01); *G01N 27/223* (2013.01)
(58) Field of Classification Search
    CPC .................................................. A01G 25/162
    See application file for complete search history.

(56) References Cited

U.S. PATENT DOCUMENTS

2014/0109658 A1* 4/2014 Kah, Jr. ................. G01N 5/025
                                                              73/73
2016/0187266 A1  6/2016 Annan et al.

2018/0129175 A1* 5/2018 Jennings ................ G05B 15/02
2020/0241579 A1* 7/2020 Ben-Ner ................ G06Q 50/02
2020/0348254 A1  11/2020 Sheikh et al.
2021/0102907 A1* 4/2021 Couture ............... G01N 23/203
2023/0094121 A1  3/2023 Eddaoudi et al.
2023/0175830 A1* 6/2023 Clonch .................... G01B 7/12
                                                              33/555.1
2024/0321074 A1  9/2024 Brinkschulte et al.

OTHER PUBLICATIONS

Maria Conesa (Trunk dielectric permittivity correlates with Irrigation based on soil content in fruit trees), Smart Agricultural Technology 7, 2024, 100428.*
Smart Agraculture (Year: 2024).*

* cited by examiner

*Primary Examiner* — Nathan L Laughlin
(74) *Attorney, Agent, or Firm* — Nath, Goldberg & Meyer; Joshua B. Goldberg

(57) ABSTRACT

The automated irrigation system for trees includes a capacitance sensor having a pair of probe plates configured for clamping a trunk of a tree therebetween. The capacitance sensor is configured to measure a capacitance of a portion of the trunk of the tree between the pair of probe plates. A water reservoir stores water for irrigation, and a pump is in fluid communication with the water reservoir for selectively pumping the water therefrom. A conduit is in fluid communication with the pump for carrying the water pumped by the pump to soil around the tree. A controller is in communication with the capacitance sensor and the pump. The controller is configured to calculate a relative permittivity of the portion of the trunk of the tree and to actuate the pump to deliver water to the soil around the tree when the relative permittivity falls below a predetermined threshold.

2 Claims, 1 Drawing Sheet

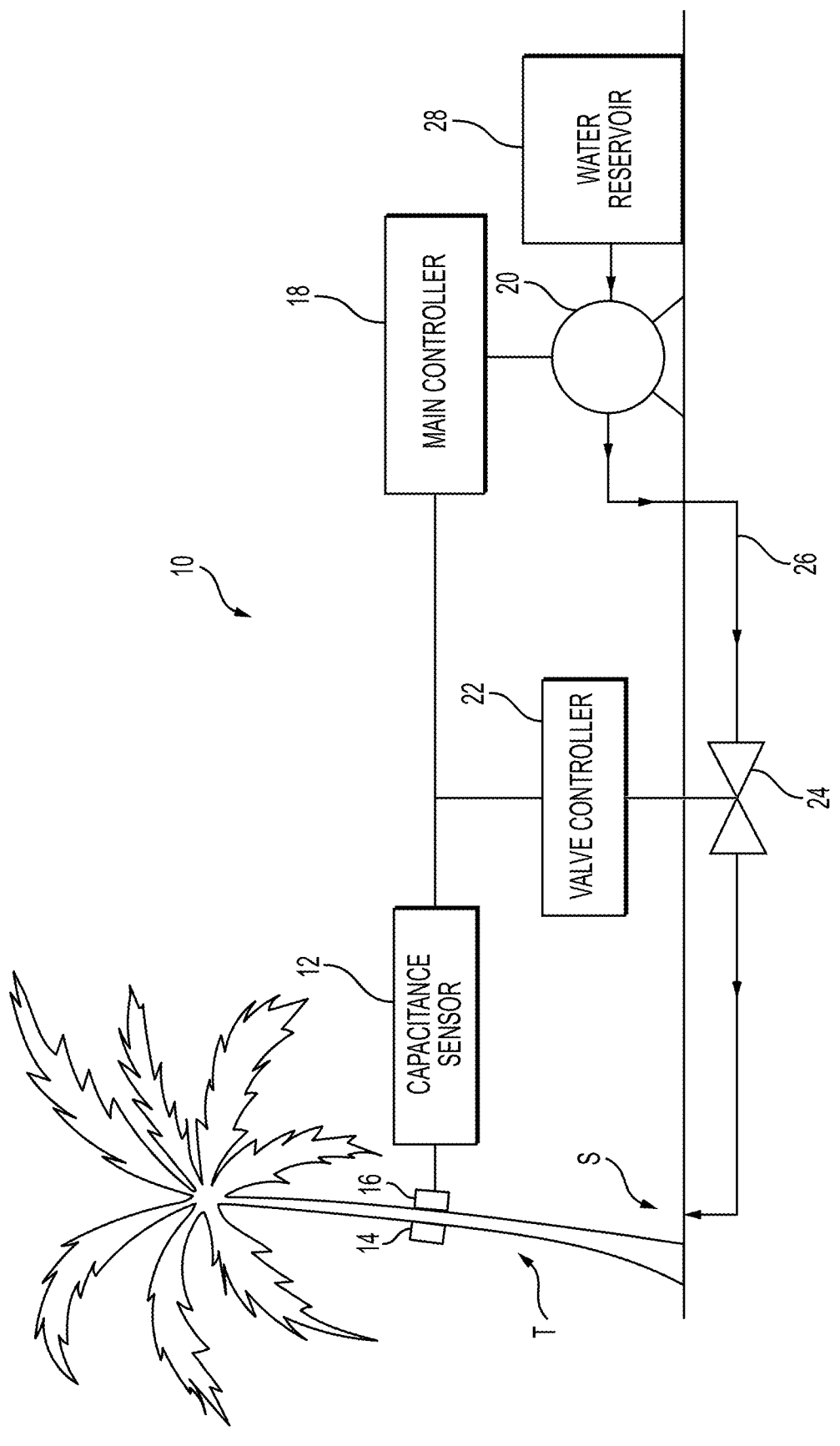

AUTOMATED IRRIGATION SYSTEM FOR TREES

BACKGROUND

Field

The disclosure of the present patent application relates to irrigation, and particularly to an automated system for irrigating trees based on measured capacitance of tree trunks.

Description of Related Art

Although a variety of different types of automated irrigation systems have been used in agriculture, most irrigation systems rely on making measurements of the water content of the relevant soil. Although measuring water content in the soil provides an approximate indicator of water content in the plants and trees growing in the soil, it cannot provide a direct and accurate measurement of the actual water content in the flora. Both underwatering and overwatering of plants and trees can be detrimental to their health, thus an accurate measurement of the water content within the plants and trees themselves is required in order to control irrigation for optimal health and maintenance. Thus, an automated irrigation system for trees solving the aforementioned problems is desired.

SUMMARY

The automated irrigation system for trees uses a capacitance sensor to measure water content levels within a tree so that the tree can be irrigated when the water content level falls below a predetermined threshold. The capacitance sensor includes a pair of probe plates configured for clamping a trunk of the tree therebetween. The capacitance sensor is configured to measure a capacitance of a portion of the trunk of the tree between the pair of probe plates. A water reservoir is provided for storing a volume of water for irrigation, and a pump is in fluid communication with the water reservoir for selectively pumping the water therefrom. A conduit is in fluid communication with the pump for carrying the water pumped by the pump to soil around the tree. A controller is in communication with the capacitance sensor and the pump. The controller is configured to calculate a relative permittivity of the portion of the trunk of the tree between the pair of prove plates as $$\varepsilon_r = \frac{C \times P_{trunk}}{\varepsilon_0 \times A_{SNS} \times \pi},$$

where $\varepsilon_r$ is the relative permittivity, C is the capacitance of the portion of the trunk of the tree between the pair of probe plates measured by the capacitance sensor, $P_{trunk}$ is a circumference of a perimeter of the portion of the trunk of the tree between the pair of probe plates, $\varepsilon_0$ is the absolute permittivity in vacuum, and $A_{SNS}$ is a surface area of the pair of probe plates. The controller is further configured to actuate the pump to deliver water to the soil around the tree when the relative permittivity falls below a predetermined threshold. A valve may be provided for selectively controlling flow of the water carried by and/or through the conduit. Alternatively, the controller may determine the need to irrigate the tree based on a function, $\theta_{TWC}$, of the relative permittivity. The function $\theta_{TWC}$ correlates the total water content (TWC) of the portion of the trunk of the tree to the relative permittivity. The function $\theta_{TWC}(\varepsilon_r)$ may be determined experimentally through laboratory measurement of the actual water content contained in the trunk of the tree based on the measured and calculated relative permittivity. Instead of the controller actuating the pump and/or opening the valve when the relative permittivity falls below the predetermined threshold, the controller may actuate the pump and/or open the valve when the function $\theta_{TWC}(\varepsilon_r)$ falls below a secondary threshold.

The total water content (TWC), once calculated based on the relative permittivity, can then be easily translated into a volume of water contained in the portion of the tree trunk, $V_{TWC}$. As a further alternative, multiple capacitance sensors may be used to calculate a total water volume of the trunk of the tree spanned by the multiple sensors. For N pairs of probe plates attached to the trunk of the tree, the total water volume in the trunk spanned by the sensors at time t, $TV_{TWC}(t)$, is calculated as $$TV_{TWC}(t) = \frac{\sum_{1}^{N} V_{TWC,N}(t) \times H_{TRK}}{H_{SNS} \times N},$$

where $V_{TWC,N}(t)$ is the volume of water in the portion of the trunk spanned by the probe plates of the $N^{th}$ sensor, $H_{TRK}$ is the total height of the trunk, and $H_{SNS}$ is the height of each probe plate. The calculation of $TV_{TWC}(t)$ by the controller may be used to control irrigation time, i.e., the duration of water flow as controlled by the controller operating the pump and/or the valve.

These and other features of the present subject matter will become readily apparent upon further review of the following specification.

BRIEF DESCRIPTION OF DRAWINGS

The sole drawing FIGURE illustrates an automated irrigation system for trees.

Similar reference characters denote corresponding features consistently throughout the attached drawings.

DETAILED DESCRIPTION

As shown in the sole drawing FIGURE, the automated irrigation system for trees 10 uses a capacitance sensor 12 to measure water content levels within a tree T so that the tree T can be irrigated when the water content level falls below a predetermined threshold. The capacitance sensor 12 includes a pair of probe plates 14, 16 configured for clamping a trunk of the tree T therebetween. It should be understood that any suitable type of capacitance sensor may be used, as is well known in the art. The capacitance sensor 12 is configured to measure a capacitance of a portion of the trunk of the tree T between the pair of probe plates 14, 16. In this regard, the capacitance sensor 12, in certain embodiments, can include an analog-to-digital converter (ADC).

In certain embodiments, the pair of probe plates 14, 16 can each have an equal area. Capacitance is directly proportional to the area of the pair of probe plates 14, 16. The larger the plate area, the greater the electrical capacitance, and the easier it can be to measure the change in relative permittivity. In further embodiments, the pair of probe plates 14, 16 can be made from conductive materials, including by way of non-limiting example aluminum, copper, or the like.

A water reservoir 28 is provided for storing a volume of water for irrigation, and a pump 20 is in fluid communication with the water reservoir 28 for selectively pumping the water therefrom. It should be understood that any suitable type of water reservoir, container, barrel, etc. may be utilized, and it should be further understood that any suitable type of pump may be used. A conduit 26 is in fluid communication with the pump 20 for carrying the water pumped by the pump 20 to soil S around, and in the vicinity of, the tree T. In this regard, water delivered to soil S around and/or in the vicinity of the tree is in sufficient proximity to the tree such that the delivered water can be readily delivered to and used by the tree.

A main controller 18 is in communication with the capacitance sensor 12 and the pump 20. It should be understood that main controller 18 may be any suitable type of controller, such as a computer, processor, programmable logic controller or the like. The main controller 18 is configured to calculate a relative permittivity, $\varepsilon_r$, of the portion of the trunk of the tree T between the pair of probe plates 14, 16 as $$\varepsilon_r = \frac{C \times P_{trunk}}{\varepsilon_0 \times A_{SNS} \times \pi},$$

where C is the capacitance of the portion of the trunk of the tree T between the pair of probe plates 14, 16 measured by the capacitance sensor 12, $P_{trunk}$ is a circumference of a perimeter of the portion of the trunk of the tree T between the pair of probe plates 14, 16, $\varepsilon_0$ is the absolute permittivity in vacuum (a well-known physical constant, as would be recognized by one of ordinary skill in the art), and $A_{SNS}$ is a surface area of the pair of probe plates 14, 16 making contact with the trunk of tree T. The main controller 18 is further configured to actuate the pump 20 to deliver water to the soil S around, and in the vicinity of, the tree T when the relative permittivity $\varepsilon_r$ falls below a predetermined threshold.

In certain embodiments, the main controller 18 can manage charging and discharging cycles of the capacitor, while the ADC (present in the main controller 18 or the capacitance sensor 12) can measure the voltage output from the pair of probe plates 14, 16. This configuration can permit accurate, real-time monitoring of trunk water content, ensuring that irrigation water application decisions are based on reliable, species-specific data.

A valve 24 may be provided for selectively controlling flow of the water carried by the conduit 26. In the sole drawing FIGURE, the valve 24 is shown under the control of a valve controller 22. Valve controller 22 may be an independent controller, or control module, or may be part of main controller 18. When valve controller 22 is a separate controller, it should be understood that valve controller 22 may be any suitable type of controller, such as a computer, processor, programmable logic controller or the like. Further, it should be understood that capacitance sensor 12, valve controller 22, main controller 18, pump 20 and valve 24 may be in communication with one another through any suitable type of communication medium and/or using any suitable type of communication protocol. As a non-limiting example, the capacitance sensor 12, valve controller 22, main controller 18, pump 20 and valve 24 may be configured to communicate with one another through wireless communication. Each of the capacitance sensor 12, valve controller

22 and main controller 18 may have a real-time clock module in order to synchronize the time and date with one another.

Alternatively, the controller may determine the need to irrigate the tree based on a function, $\theta_{TWC}$, of the relative permittivity. The function $\theta_{TWC}$ correlates the total water content (TWC) of the portion of the trunk of the tree to the relative permittivity, which may be correlated with the tree trunk's internal water content. The function $\theta_{TWC}(\varepsilon_r)$ may be determined experimentally through laboratory measurement of the actual water content contained in the trunk of the tree T based on the measured and calculated relative permittivity $\varepsilon_r$. Instead of the controller actuating the pump and/or opening the valve when the relative permittivity $\varepsilon_r$ falls below the predetermined threshold, the main controller 18 may actuate the pump 20 and/or open the valve 24 when the function $\theta_{TWC}(\varepsilon_r)$ falls below a secondary threshold.

The total water content (TWC), once calculated based on the relative permittivity, can then be easily translated into a volume of water contained in the portion of the tree trunk, $V_{TWC}$. In this embodiment, although $\theta_{TWC}(\varepsilon_r)$ falling below the secondary threshold determines when the pump 20 should be actuated, $V_{TWC}$ calculated from the previous day determines how much water should be delivered to soil S. The quantity of the water delivered is controlled by the time pump 20 is allowed to operate and/or the time valve 24 is allowed to remain open. The volume of water of the portion of the tree trunk, $V_{TWC}$, can be measured in the laboratory by determining a change in weight of the trunk segment. Thus, based on measured capacitance, $\varepsilon_r$ over different times can be determined, and based on weight measurements of the portion of the tree trunk corresponding to each capacitance measurement, the correlation $\theta_{TWC}(\varepsilon_r)$ between measured $\varepsilon_r$ and the volume of water contained in the portion of the tree trunk, $V_{TWC}$, can be determined.

As a further alternative, multiple capacitance sensors may be used to calculate a total water volume of the trunk of the tree spanned by the multiple sensors. As a non-limiting example, three capacitance sensors 12 may be used, each taking capacitance measurements of a different portion of the tree trunk every 10 minutes, by way of non-limiting example. For N pairs of probe plates attached to the trunk of the tree, the total water volume in the trunk spanned by the sensors at time t, $TV_{TWC}(t)$, is calculated as $$TV_{TWC}(t) = \frac{\sum_{1}^{N} V_{TWC,N}(t) \times H_{TRK}}{H_{SNS} \times N},$$

where $V_{TWC,N}(t)$ is the volume of water in the portion of the trunk spanned by the probe plates of the $N^{th}$ sensor, $H_{TRK}$ is the total height of the trunk, and $H_{SNS}$ is the height of each probe plate. The calculation of $TV_{TWC}(t)$ by the main controller 18 may be used to control irrigation time, i.e., the duration of water flow as controlled by the main controller 18 and/or valve controller 22 operating the pump 20 and/or the valve 24.

Measurements of the total water volume may be made at regular intervals. As a non-limiting example, the sensors may be activated every 10 minutes. Thus, a difference in total water volume, $\Delta TV_{TWC}(t)$, between successive time periods $t_i$ and $t_{i-1}$ can be calculated as $\Delta TV_{TWC}(t) = TV_{TWC}(t_i) - TV_{TWC}(t_{i-1})$. Water application time (WAT) may then be calculated based on $$\Delta TV_{TWC}(t) \text{ as } WAT = \frac{\sum \Delta TV_{TWC}(t)}{Q_{sys} \times EF_{WA} \times (1 - LR)},$$

where $Q_{sys}$ is the rate of water flow for the system, $EF_{WA}$ is the efficiency of the water application to the soil, and LR is the leeching requirement of the soil.

In certain embodiments, the presently described systems can include a real-time clock module as a part of the controller for scheduling irrigation water application. This real-time clock module can be used to set the time and date for the presently described system, even if power is disconnected therefrom. Therefore, the real-time clock module can be included with the controller to synchronize the time and date across the system.

In other embodiments, the presently described systems can include a touch display, permitting a user to interact with the system. The touch display, if present, can display various data and can be used by the user to enter various inputs to the system.

It is to be understood that the automated irrigation system for trees is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:
1. An automated irrigation system for trees, comprising:
a capacitance sensor having a pair of probe plates configured for clamping a trunk of a tree therebetween, the capacitance sensor being configured to measure a capacitance of a portion of the trunk of the tree between the pair of probe plates;
a water reservoir configured to store a volume of water;
a pump in fluid communication with the water reservoir for selectively pumping the water therefrom;
a conduit in fluid communication with the pump for carrying the water pumped by the pump to soil around the tree; and
a controller in communication with the capacitance sensor and the pump, wherein the controller is configured to:
calculate a relative permittivity of the portion of the trunk of the tree between the pair of probe plates as

$$\varepsilon_r = \frac{C \times P_{trunk}}{\varepsilon_0 \times A_{SNS} \times \pi},$$

wherein $\varepsilon_r$ is the relative permittivity, C is the capacitance of the portion of the trunk of the tree between the pair of probe plates measured by the capacitance sensor, $P_{trunk}$ is a circumference of a perimeter of the portion of the trunk of the tree between the pair of probe plates, $\varepsilon_0$ is the absolute permittivity in vacuum, and $A_{SNS}$ is a surface area of the pair of probe plates; and
actuate the pump to deliver water to the soil around the tree when the relative permittivity falls below a predetermined threshold.
2. The automated irrigation system for trees as recited in claim 1, further comprising a valve for selectively controlling flow of the water carried by the conduit.

\* \* \* \* \*